Patented Mar. 2, 1937

2,072,628

UNITED STATES PATENT OFFICE 2,072,628

ROSIN ACID AND PROCESS OF PRODUCING THE SAME

Edward A. Brennan, Savannah, Ga., Stanley E. Cairncross, Palisades Park, N. J., Torsten Hasselstrom, New York, N. Y., and Washington Hull, Savannah, Ga.

No Drawing. Application June 15, 1933, Serial No. 675,976

14 Claims. (Cl. 260—108)

The present invention relates to a new rosin acid, herein termed pseudopimaric acid, and compounds thereof, and to the process of producing the said rosin acid and compounds thereof.

An object of the present invention is to provide a novel rosin acid which can be obtained from rosin, rosin oils having an appreciable resin acid content, or a suitable heat-treated rosin.

A further object of the invention is to provide a method of treating rosin which is capable of causing a rearrangement in the molecule of the resin acids initially present and the formation of an acid which can be refined to produce a purified product of water white quality, great hardness and great stability to heat, light or air.

It is another object of the invention to provide a novel rosin acid of a complex structure which can be refined to a state of high purity by the use of practical procedures.

It is also an object of the invention to provide a process for treating rosin, suitable rosin oil, or heat-treated rosin, which can be carried out practically and commercially on an industrial scale to produce the novel pseudopimaric acid and compounds thereof.

It is also within the contemplation of the invention to provide a process for producing pseudopimaric acid from suitable rosin oils obtained from rosin by procedures involving destructive distillation.

Other objects and advantages will become apparent from the following description of the invention.

The invention may be carried into practice by the utilization of appropriate procedures, and the following examples are given for illustrative purposes and for a better understanding of the invention by those skilled in the art.

Example No. 1

Rosin oil having an appreciable resin acid content, say at least about five percent, or a product obtained from rosin by suitable heat treatment (with or without distillation), such as a rosin known in the trade as a heat treated or partially distilled rosin, is extracted with an aqueous solution of an alkali, which is preferably caustic soda or caustic potash. As those skilled in the art know, an alkali refers to, as Couch states in his book a "Dictionary of Chemical Terms" (published in 1920), the hydroxides of potassium, sodium, lithium, caesium, rubidium, and ammonium. This extraction is carried out preferably by thoroughly mixing the raw material and the alkaline solution in an appropriate manner, as by stirring or agitation, and is continued until practically complete saponification is accomplished. In order to break up any emulsion and to facilitate the separation of the mixture into distinct layers, some methanol or other suitable solvent is added just prior to the termination of the agitation. Upon standing, the mixture then separates into two layers, the upper consisting mainly of unsaponifiable material and the lower one containing the alkali pseudopimarate in alkaline solution. This lower layer is then drawn off, acidified with a dilute mineral acid, such as hydrochloric acid or sulfuric acid, or by the addition of a suitable acid salt, such as nitre cake. This acidification precipitates the novel acid, herein called pseudopimaric acid, as a viscous sticky mass which is collected by agglomeration and then removed. It is then pressed to free it as much as possible from adhering mother-liquor, and is washed thoroughly with water until substantially free from all water-soluble contaminants. The crude acid is then dried in any suitable way.

Example No. 2

Rosin oil having an appreciable resin acid content, say at least about five percent, or a product obtained from rosin by suitable heat treatment (with or without distillation), such as a rosin known in the trade as a heat treated rosin or a partially distilled rosin, is extracted with an aqueous solution of an alkali, which is preferably caustic soda or caustic potash. This extraction is carried out preferably by thoroughly mixing the raw material and the alkaline solution in an appropriate manner, as by stirring or agitation, and is continued until practically complete saponification is accomplished. In order to break up any emulsion and to facilitate the separation of the mixture into distinct layers, some methanol or other suitable solvent is added just prior to the close of the agitation. Upon standing, the mixture then separates into two layers, the upper consisting mainly of unsaponifiable material and the lower one containing the alkali pseudopimarate in alkaline solution. This lower layer is then drawn off and repeatedly extracted with benzene, or other suitable organic solvent, to free it from unsaponifiable material held in solution or suspension by the alkali soap solution. The benzene layer is separated, and the aqueous layer of soap solution is heated to eliminate any benzene present, cooled and then acidified with a dilute mineral acid, such as hydrochloric acid or sulfuric acid, which causes the pseudopimaric acid to precipitate as a flocculent solid, which is filtered out, washed with water, and dried by suitable means.

For the further purification, the partially purified pseudopimaric acid, as obtained in Example No. 1 or No. 2, is distilled, preferably under reduced pressure, in any standard or conventional apparatus used for such purposes, and the fraction which boils at 235-285° C. at a pressure of about 1 mm., is collected. It has been found best to use an apparatus with a condenser worm made of aluminum. The aforesaid operation produces a distillate which is a resin of water white or lighter grade, of great hardness, and of great stability to heat, light or air. It is of superior grade and value to the raw material from which it is produced.

It has been discovered that the crude pseudopimaric acid forms a crystalline ammonium salt and that the purification may also be effected by means of the aforesaid ammonium salt. Thus, the crude pseudopimaric acid is mixed with an excess of dilute aqueous ammonium hydroxide solution and the mixture is boiled until the acid is completely dissolved. The solution is then diluted with twice its volume of water and the whole is boiled for about 20 minutes. As this solution cools the ammonium pseudopimarate separates in long colorless needles, which can be collected by filtration or other suitable means. In practice, it has been found that the yield of ammonium pseudopimarate closely approximates the theoretically yield.

The ammonium salt can be used for regeneration of pseudopimaric acid itself by digesting it with a dilute mineral acid such as hydrochloric acid or sulfuric acid.

*Example No. 3*

Rosin oil having an appreciable resin acid content, say at least about five percent, is subjected to a careful fractional distillation under reduced pressure. By controlling the distillation, the novel acid can be obtained in a crude state in the fraction which boils at about 235° to about 285° C. at about 1 mm. pressure. Instead of using rosin oil as the raw material, there may be used products which are known in the trade as heat-treated or partially-distilled rosins, which are obtained from rosin by suitable heat treatment (with or without distillation). The crude novel acid may be refined by any of the procedures set forth hereinabove or by any suitable operations.

The pseudopimaric acid produced according to the present invention has the following properties: The crude pseudopimaric acid melts at about 69-71° C. while the partially purified pseudopimaric acid melts at about 169-181° C. and has an optical angle of rotation, $(a)_D$, of about plus 25° to plus 50°. More fully refined, it melts at 195.5 to 198° C. (corr.), has an optical angle of rotation, $(a)_D$, of about plus 0.33°, and an elementary composition which corresponds approximately to the formula $C_{20}H_{30}O_2$. When dehydrogenated by heating with sulphur, it gives retene. The ammonium salt as described hereinabove is crystalline. As the properties of the new acid are not identical with either the abietic or the pimaric types of acids, we have named it pseudopimaric for convenience.

For the purpose of pointing out some distinctions between the novel pseudopimaric acid described and claimed herein and prior products, it is to be noted that according to present knowledge, the principal constituent of both gum rosin and wood rosin is alpha-abietic acid (Steele's abietic acid). When this acid is purified it has the following constants: Melting point is about 164.5-165.5° C. (corr.), and optical angle of rotation, $(a)_D$, equals about minus 53.9° to minus 80°. Such rosins contain also d-pimaric acid which, when purified, has the following constants: Melting point 210-211° C. (corr.) and optical angle of rotation, $(a)_D$, equal to about plus 72.5°. In vacuum distilled rosin, there is found beta-abietic acid (Levy's abietic acid) which, when purified, shows these constants: Melting point is about 182-183° C. (corr.), and optical angle of rotation, $(a)_D$, is equal to about minus 30.66° to minus 66.46°.

The abietic differs from the pimaric type of rosin acids in that the dehydrogenation of the abietic type, by heating with sulfur or selenium, yields retene. A similar treatment of the pimaric type usually gives pimanthrene. Ammonium abietates are generally gelatinous, whereas ammonium pimarates are frequently crystalline.

It is to be noted that the present invention provides a novel rosin acid possessing excellent properties which render it very useful commercially and industrially. Thus, it has been discovered that the novel rosin acid has very superior grease-setting properties which make it especially valuable in the manufacture of improved greases, lubricants, etc., of many kinds. The improved greases, lubricants, etc., are described and claimed in a co-pending application Serial No. 713,302, filed February 28th, 1934 (U. S. Letters Patent No. 2,042,035).

It is also to be observed that the present invention provides a novel rosin acid which can be obtained from rosin, rosin oils having an appreciable acid content or suitable heat treated rosin. Various methods of treating rosin such as destructive distillation, suitable heat treatment without distillation, and other methods may be used to cause a rearrangement in the molecule of the normal rosin acids, an acid being formed which can be refined to produce a purified product of water white quality, great hardness, and great stability to heat, light and air.

Although the present invention has been described in connection with specific operations and the like, it is to be understood that variations and modifications may be made without departing from the scope and spirit of the invention as defined in the appended claims.

We claim:

1. As a new composition of matter, pseudopimaric acid having an elementary composition corresponding approximately to the formula $C_{20}H_{30}O_2$, having a melting point of about 69-71° C. in crude state, said acid having in a refined state a melting point of about 195° C. to about 198° C. and an optical angle of rotation $(a)_D$ of about plus 0.33°.

2. As a new composition of matter, pseudopimaric acid having an elementary composition corresponding approximately to the formula $C_{20}H_{30}O_2$, having in a partially purified state a melting point of about 169-181° C. and an optical angle of rotation, $(a)_D$, of about plus 25° to plus 50°, said acid having in a refined state a melting point of about 195° C. to about 198° C. and an optical angle of rotation $(a)_D$ of about plus 0.33°.

3. As a new composition of matter, pseudopimaric acid having an elementary composition corresponding approximately to the formula $C_{20}H_{30}O_2$, having in a refined state a melting point of about 195° C. to 198° C. and an optical angle of rotation $(a)_D$, of about plus 0.33°.

4. As a new composition of matter, pseudopimaric acid having an elementary composition corresponding approximately to the formula $C_{20}H_{30}O_2$, capable of giving retene when heated with sulphur, said acid having in a refined state a melting point of about 195° C. to about 198° C. and an optical angle of rotation $(a)_D$ of about plus 0.33°.

5. As a new composition of matter, pseudopimaric acid having an elementary composition corresponding approximately to the formula $C_{20}H_{30}O_2$, capable of forming a crystalline ammonium salt, said acid having in a refined state a melting point of about 195° C. to about 198° C. and an optical angle of rotation $(a)_D$ of about plus 0.33°.

6. As a new composition of matter, pseudopimaric acid having an elementary composition corresponding approximately to the formula $C_{20}H_{30}O_2$, capable of yielding retene when heated with sulfur, and possessing water white quality, relatively great hardness and relatively great stability to heat, light and air, said acid having in a refined state a melting point of about 195° C. to about 198° C. and an optical angle of rotation $(a)_D$ of about plus 0.33°.

7. As a new composition of matter, pseudopimaric acid, having in a refined state a melting point of about 195° C. to about 198° C., an optical angle of rotation $(a)_D$ of about $+0.33°$, an elementary composition corresponding approximately to the formula $C_{20}H_{30}O_2$, capable of forming a crystalline ammonium salt, and of giving retene when heated with sulfur, possessing water-white quality, great hardness, stability to heat, light or air, and superior grease-setting properties.

8. The process of producing pseudopimaric acid which comprises treating rosin oil with an aqueous solution of an alkali, permitting the mixture to separate into two layers, the lower containing an alkali resinate and the upper containing unsaponifiable material, separating the alkali resinate in the lower layer from the unsaponifiable material in the upper layer, and acidifying the lower layer with mineral acid to precipitate the pseudopimaric acid.

9. The process of producing pseudopimaric acid which comprises treating rosin oil with an aqueous solution of an alkali, permitting the mixture to separate into two layers, the lower containing an alkali resinate and the upper containing unsaponifiable material, separating the alkali resinate in the lower layer from the unsaponifiable material in the upper layer, acidifying with mineral acid to precipitate the pseudopimaric acid, and refining the precipitated pseudopimaric acid.

10. The process of producing pseudopimaric acid which comprises extracting rosin oil with an aqueous solution of an alkali, mixing said rosin oil and said solution of an alkali for a period of time, allowing the mixture to stand until separation into two layers occurs, the lower containing an alkali resinate and the upper containing unsaponifiable material, separating the upper layer containing unsaponifiable material from the lower layer containing the alkali pseudopimarate in aqueous solution, adding dilute mineral acid to said aqueous solution containing the alkali pseudopimarate, to precipitate pseudopimaric acid.

11. The process of producing pseudopimaric acid which comprises extracting rosin oil with an aqueous solution of an alkali, mixing said rosin oil and said solution of an alkali for a period of time, allowing the mixture to stand until separation into two layers occurs, the lower containing an alkali resinate and the upper containing unsaponifiable material, separating the upper layer containing unsaponifiable material from the lower layer containing the alkali pseudopimarate in aqueous solution, adding dilute mineral acid to said aqueous solution containing the alkali pseudopimarate and purifying said pseudopimaric acid to produce a refined product.

12. The process of producing pseudopimaric acid which comprises extracting rosin oil with an aqueous solution of an alkali, mixing said rosin oil and solution of alkali for a period of time, allowing the mixture to stand to permit the separation thereof into two layers, the lower containing an alkali resinate and the upper containing unsaponifiable material, separating the upper layer containing unsaponifiable material from the lower layer containing the alkali pseudopimarate in aqueous solution, facilitating the aforesaid separation by the addition of a demulsifying agent, acidifying the lower layer containing the alkali pseudopimarate with dilute mineral acid, permitting the mixture to separate in two layers, the upper layer containing crude pseudopimaric acid, removing the upper layer containing the bulk of the crude pseudopimaric acid, washing the separated crude pseudopimaric acid, subjecting said pseudopimaric acid to distillation to refine the same, and collecting the fraction boiling at about 235° C. to about 285° C. under a pressure of about 1 mm.

13. The process of producing pseudopimaric acid which comprises extracting rosin oil with an aqueous solution of an alkali, mixing said rosin oil and solution of alkali for a period of time, allowing the mixture to stand to permit the separation thereof into two layers, the lower containing an alkali resinate and the upper containing unsaponifiable material, separating the upper layer containing unsaponifiable material from the lower layer containing the alkali pseudopimarate in aqueous solution, facilitating the aforesaid separation by the addition of a demulsifying agent, acidifying the lower layer containing the alkali pseudopimarate with dilute mineral acid, permitting the mixture to separate in two layers, the upper layer containing pseudopimaric acid, removing the upper layer containing the bulk of the pseudopimaric acid and treating said pseudopimaric acid with aqueous ammonium hydroxide, boiling the mixture until the pseudopimaric acid is practically completely dissolved, diluting the boiled solution with water, boiling the diluted solution for a period of time, cooling the solution, whereby ammonium pseudopimarate precipitates in crystalline form, and recovering the crystals of ammonium pseudopimarate.

14. The process of producing pseudopimaric acid which comprises extracting rosin oil having an appreciable resin acid content with an aqueous solution of an alkali to effect substantially complete saponification, adding methanol to said rosin oil just prior to termination of the extraction, allowing the mass to stand in order to permit a separation into two layers, the lower containing an alkali resinate and the upper containing unsaponifiable material, the upper one consisting mainly of unsaponifiable material and the lower one containing the alkali pseudopimarate in alkaline solution, separating the lower layer from the upper layer, extracting the lower one with benzene to free the same from unsaponifiable material, separating the upper benzene layer from the lower aqueous layer, heating the lower aqueous layer to eliminate benzene, cooling the mass, adding dilute mineral acid to the mass to precipitate pseudopimaric acid, and recovering the precipitated pseudopimaric acid.

EDWARD A. BRENNAN.
STANLEY E. CAIRNCROSS.
TORSTEN HASSELSTROM.
WASHINGTON HULL.